United States Patent [19]

Tanibata

[11] Patent Number: 5,602,618
[45] Date of Patent: *Feb. 11, 1997

[54] IMAGE PRINTER WITH OVERLAPPING PROJECTION AND IMAGE EXPOSURE UNITS

[75] Inventor: Toru Tanibata, Wakayama, Japan

[73] Assignee: Noritsu Koki Co., Ltd., Wakayama-ken, Japan

[*] Notice: The term of this patent shall not extend beyond the expiration date of Pat. No. 5,428,422.

[21] Appl. No.: 249,779

[22] Filed: May 26, 1994

[30] Foreign Application Priority Data

Jun. 3, 1993  [JP]  Japan ................................. 5-133604

[51] Int. Cl.$^6$ .................................................. G03B 27/52
[52] U.S. Cl. .............................................. 355/40; 355/39
[58] Field of Search .............................. 355/18, 39, 40, 355/41; 358/296, 300, 302

[56] References Cited

U.S. PATENT DOCUMENTS

| | | | |
|---|---|---|---|
| 5,072,253 | 12/1991 | Patton | 355/40 |
| 5,184,227 | 2/1993 | Foley | 358/302 |
| 5,278,610 | 1/1994 | Ishiwatari et al. | 355/64 |
| 5,337,119 | 8/1994 | Tanibata | 355/40 |
| 5,428,422 | 6/1995 | Tanibata | 355/40 |
| 5,430,523 | 7/1995 | Tanibata | 355/40 X |

FOREIGN PATENT DOCUMENTS

| | | |
|---|---|---|
| 0305327 | 3/1989 | European Pat. Off. . |
| 0308967 | 3/1989 | European Pat. Off. . |
| 1-291236 | 11/1989 | Japan . |
| 3-58096 | 9/1991 | Japan . |

*Primary Examiner*—Fred L. Braun
*Attorney, Agent, or Firm*—Townsend and Townsend and Crew LLP

[57] ABSTRACT

An image printer includes a projection exposure unit for projecting and exposing an image of a film onto a photosensitive material, an image exposure unit for exposing the photosensitive material based on exposure image information with setting an exposure amount for each of a number of areas of the photosensitive material, a transport device for transporting the photosensitive material through the projection exposure unit and the image exposure unit, a reader device for reading the image information of the film with dividing the image information into a number of areas, and a correction information inputting device for inputting a correction-target portion of the image information read by the reader device and a correction content for the correction-target portion. Based on the image information read by the reader device and on correction information instructed by the correction information inputting device, the image exposure unit generates, as the exposure image information, image information concerning only the correction-target portion corrected in accordance with the correction content. The transport device transports the photosensitive material in such a manner that the projection exposure by the projection exposure unit and the exposure by the image exposure unit are effected in an overlapping manner onto the photosensitive material.

10 Claims, 4 Drawing Sheets

= projection-exposed portion

= moving-exposed portion

IMAGE PRINTER WITH OVERLAPPING PROJECTION AND IMAGE EXPOSURE UNITS

BACKGROUND OF THE INVENTION

1. Field of the Invention

The present invention relates to an image printer.

2. Description of the Related Art

One conventional invention known as an image printer for exposing a photosensitive material with an image recorded on a film is as follows (Japanese laid-open patent gazette No. 63-189262).

That is, aside from an ordinary image printer for projecting and exposing a film image on a photosensitive material, a further image printer is known. In this printer, image information of a film is read with dividing the image information into a number of areas and an exposure amount is set for each of the number of areas. The photosensitive material is exposed with the exposure amounts of the respective areas being adjusted by an electronic shutter comprised of PLZT or liquid crystal elements operable in correspondence with each of the number of areas.

Different from the image printer operable through projection-exposure, such image printer described above is capable of effecting a variety of processing on the read image information since the image information is processed as a number of divided areas. Such processings include, for instance, correction of contrast or of color tone of the read image information.

However, while the above-described convention is convenient as being capable of effecting a variety of processings on the read image information, since the exposure of the photosensitive material is effected with an exposure amount being set for each of a number of areas, there tends to occur the inconvenience that the image produced through the exposure on the photosensitive material shows, in a micro view, a zigzag contour portion in one direction of the image corresponding to the configuration of the picture elements constituting the number of areas thereby to deteriorate the image quality.

The present invention attends to this inconvenience. A primary object of the present invention is to provide an image printer capable of producing an image of an improved quality after correction of the image information.

SUMMARY OF THE INVENTION

For achieving the above-noted object, an image printer, according to the present invention, comprises:

a projection exposure unit for projecting and exposing an image of a film onto a photosensitive material;

an image exposure unit for exposing the photosensitive material based on exposure image information with setting an exposure amount for each of a number of areas of the photosensitive material;

transport means for transporting the photosensitive material through the projection exposure unit and the image exposure unit;

reader means for reading the image information of the film with dividing the image information into a number of areas;

correction information inputting means for inputting a correction-target portion of the image information read by the reader means and a correction content for the correction-target portion;

wherein, based on the image information read by the reader means and on correction information instructed by said correction information inputting means, said image exposure unit generates, as said exposure image information, image information concerning only said correction-target portion corrected in accordance with said correction content; and said transport means being adapted to transport said photosensitive material in such a manner that the projection exposure by said projection exposure unit and the exposure by said image exposure unit are effected in an overlapping manner onto the photosensitive material.

According to the above-described construction, as the reader means reads image information of a film and correction information including designation of a correction-target portion within the image information and a correction content for the correction-target portion, the image exposure unit singles out the image information of the correction-target portion from the read image information and effects a correction on this singled-out image information in accordance with the correction content inputted through the correction information inputting means, thereby to generate the exposure image information.

Then, the transport means transports the photosensitive material so that this photosensitive material may be processed both in an overlapping manner, with the projection exposure by the projection exposure unit for the film image information read by the reader means and with the further exposure based on the exposure image information generated by the image exposure unit with exposure amounts being set for the respective areas.

That is to say, with the exposure at the image exposure unit, the image produced through this exposure on the photosensitive material shows, in a micro view, a zigzag contour portion in one direction of the image corresponding to the configuration of the picture elements constituting the number of areas. Yet, as this exposure is effected in an overlapping manner with the exposure at the projection exposure unit, the micro zigzag contour becomes less conspicuous.

Hence, the invention has achieved its intended object of providing an image printer capable of producing an image of an improved quality after correction of the image information.

According to one aspect of the present invention, the image printer further comprises a monitor device for displaying the image information read by the reader means.

With this provision of the monitor device, as the image information read by the reader means is displayed on the monitor device, by viewing this monitor display, an operator may judge what kind of correction is to be effected. Thus, the image printer having this feature will be more convenient.

According to a further aspect of the present invention, said correction information inputting means designates the correction-target portion with respect to the image information displayed on the monitor device.

With this construction, the reader means reads the image information of the film and this image information is displayed on the monitor device. Then, as the operator designates a correction-target portion on the monitor display, the image exposure unit may generate the exposure image information for this designated correction-target portion. Thus, the image printer having this feature will be even more convenient.

According to a still further aspect of the present invention, the image printer further comprises:

a controller for controlling the operations of the projection exposure unit, the image exposure unit and of the transport means;

exposure-mode instructing means for instructing said controller to be switched over between a double exposure mode and a projection exposure mode;

with an instruction of the double exposure mode, said controller executing a control scheme for effecting the exposure at the projection exposure unit and the further exposure at the image exposure unit in an overlapping manner onto the photosensitive material; whereas, with an instruction of the projection exposure mode, said controller executing a further control scheme for effecting the exposure at the projection exposure unit onto the photosensitive material.

That is to say, in case the image information of the film does not need any correction, the exposure operation of this film image may be effected speedily at the projection exposure unit. On the other hand, in case the image information needs some correction, this correction of the film image information may be effected properly under the double exposure mode.

As a result, only with the instruction of either the double exposure mode or the projection exposure mode from the exposure mode instructing means, the controller appropriately controls the projection exposure unit and the image exposure unit. Hence, the image printer having this construction will be even more convenient.

According to a still further aspect of the present invention, the reader means is disposed so as to read image information of a film charged to film feeder means for feeding the film to said projection exposure unit.

With this construction, the reader means reads the image information of the film charged to the film feeder means in association of a film feeding operation of the film feeder means, then, based on this read image information the image exposure unit is operated.

As a result, the projection exposure unit and the image exposure unit may commonly use the same film feeder means, whereby it becomes unnecessary to distinguish between different film charging positions at the two exposure units.

Furthermore, the reader means and the film need to be moved relative to each other in order to allow the reader means to read the image information of this film. In this respect, with the above-described construction, the reader means may read the film image information by utilizing the film feeding operation by the film feeder means.

Thus, the image printer with this feature will be even more convenient without complication of the apparatus construction.

According to a still further aspect of the present invention, when the double exposure mode is instructed, the controller corrects an exposure amount at the projection exposure unit in accordance with a degree of correction of the correction content inputted through the correction information inputting means.

With this feature, in the case of the double exposure mode, the exposure amount at the projection exposure unit is corrected in accordance with a degree of correction of the correction content inputted through the correction information inputting means.

As a result, a more appropriate correction may be effected.

Further and other objects, features and effects of the invention will become apparent from the following more detailed description of the embodiments of the invention with reference to the accompanying drawings.

DESCRIPTION OF THE PREFERRED EMBODIMENTS

Now, preferred embodiments of an image printer according to the present invention will be described in details with reference to the accompanying drawings.

Figure 1:
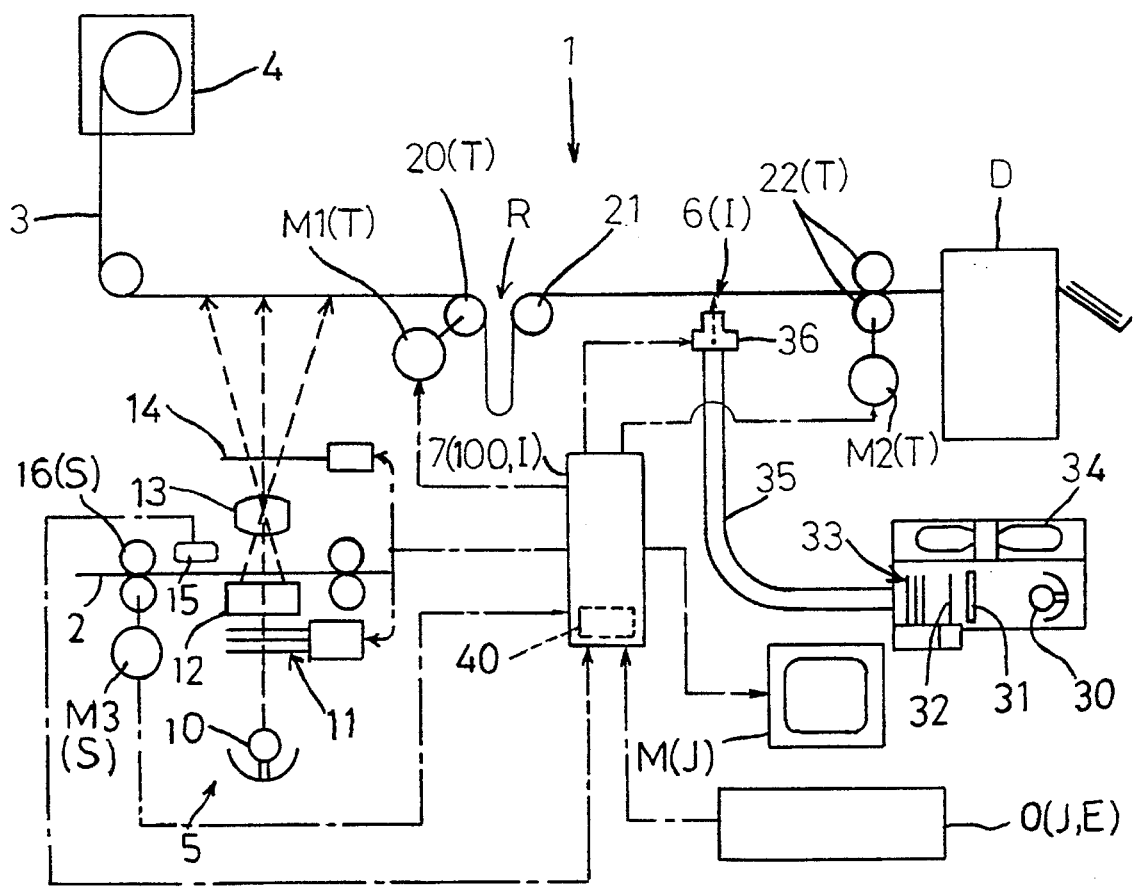
FIG. 1 is a schematic construction view of an image printer according to one preferred embodiment of the present invention.

As shown in FIG. 1, an image printer 1 includes a projection exposure unit 5 for projecting and exposing image information of a film 2 on to a print paper 3 as a photosensitive material, a moving exposure unit 6 for dividing the image information to be exposed on to the print paper 3 into a plurality of lines and then exposing each line, a loop forming unit R for adjusting a difference between processing speeds at the projection exposure unit 5 and the moving exposure unit 8, a developing unit D for developing the exposed print paper 3, and a controller 7 for controlling the above-described components of the image printer 1. This controller 7 is connected to a control panel 0 for effecting various instruction input operations and to a monitor device M for displaying the image information.

Then, after the print paper 3 is withdrawn from a print paper holder 4 in which the print paper 3 is stored in a rolled state, the print paper 3 is exposed at either one or both of the projection exposure unit 5 and the moving exposure unit 6 and then is developed at the developing unit D. Then, the print paper 3 is cut into a paper strip including one-frame amount of image information and discharged from the printer.

This image printer 1 operates in two modes, i.e. a projection exposure mode and a double exposure mode. In the case of the projection exposure mode, the image of the film 2 is projected and exposed on to the print paper 3 at the projection exposure unit 5. In the case of the double exposure mode, after the projection exposure operation of the image of the film 2 at the projection exposure unit 5, this projection-exposed portion of the print paper 3 is transported to a predetermined position of the moving exposure unit 6 to undergo a double-exposure operation. Exposure image information to be exposed onto the print paper 3 at the moving exposure unit 6, to be described later, comprises information produced for correcting contrast of a part of the image of the film 2. Which of these two operation modes to be effected is selected by an input of instruction from the control panel O.

Next, the respective components will be specifically described.

The projection exposure unit 5 includes a projection exposure light source 10, a light modulating filter 11 for adjusting color balance of the light to be irradiated on to the film 2, a mirror tunnel 12 for uniformly mixing color components of the light having passed the light modulating filter 11, a printing lens 13 for printing the image information of the film 2 on to the print paper 3, and a shutter 14, with these components being arranged along a same optical path.

On the upstream side of the transport passage of the film 2 relative to the projection exposure unit 5, there is disposed an image sensor 15 for reading the image information of the film 2 with the information being divided into a number of areas. This image sensor 15 irradiates white beam on to the film 2 and resolves its reflected or transmission light into three primary color components of red, green and blue, so that intensity of each component is measured by e.g. a CCD line sensor. The image information read by this image sensor 15 is used both in exposure at the projection exposure unit 5 and in exposure at the moving exposure unit 6.

On the upstream side of the transport passage of the film 2 relative to the image sensor 15, there are disposed a roller 16 for feeding the film 2 to the projection exposure unit 5 and a motor M3 for rotatably driving the roller 16.

At the projection exposure unit 5, based on the image information read by the image sensor 15 in association with the feeding operation of the film 2 by the roller 16 and the motor M3, the controller 7 controls the light modulating filter 11 to adjust the irradiation beam of the projection exposure light source 10 to a color balance according to the color densities of the image of the film 2. Thereafter, this adjusted light is irradiated to the film 2 so as to print the image information of the film 2 on to the print paper 3.

The loop forming unit R includes rollers 20, 21 for transporting the print paper 3 and a motor M1 for rotatably driving the roller 20. Between the roller 20 disposed on the upstream side of the print paper transporting direction and the roller 21 disposed on the downstream side of the print paper transporting direction, though not shown, there is interposed a flap switchable between a condition for linearly guiding the print paper 3 between the rollers 20, 21 and a further condition for allowing formation of a loop of the print paper 3 as shown in FIG. 1. With the formation of the loop, difference between processing speeds of the print paper 3 at the projection exposure unit 5 and the moving exposure unit 6 may be adjusted.

The moving exposure unit 6 includes an exposure light source 30, an IR cut filter 31 for eliminating infrared beam component from the light emitted from the exposure light source 30, a shutter 32, a light modulating filter 33 for adjusting color balance of the light from the exposure light source 30, a PLZT print head 36, and an optical fiber bundle 35 for transmitting the light from the exposure light source 30 to the PLZT print head 36. And, the exposure light source 30, the IR cut filter 31, the shutter 32 and the light modulating filter 33 are accommodated inside a single casing together with a cooling fan motor 34.

The light modulating color filter 33 includes color filters of yellow (Y), magenta (M) and cyanogen (C), with the filters being independently projectable into and retractable from an optical path. Then, with projecting and retracting movements of the respective color filters, the light from the exposure light source 30 is switched over to one of exposing colors of e.g. red, green and blue.

The PLZT print head 36, though not shown, includes a great number of assemblies each consisting of PLZT interposed between a polarizer and an analyzer, with the assemblies being linearly arranged in a direction perpendicular to the transporting direction of the print paper 3. Then, by varying a voltage to be impressed to a pair of electrodes attached to each PLZT, the polarizing direction of the light passing between the electrodes is varied so as to selectively allow or inhibit the passage of the light through each PLZT. In this manner, the print head functions as a light shutter.

With the above, through the independent control of the voltages to be applied to the great number of PLZT and the switch-over of the light modulating filter 33 to a desired exposing color corresponding to the three primary color components of red, green and blue, an exposure amount is set for each of the areas together constituting the image information with respect to one-line amount of this image information, thereby to effect color exposure of the print paper 3.

On the downstream side of the transporting passage of the print paper 3 relative to the moving exposure unit 6, there are disposed a roller 22 for transporting the print paper 3 and a motor M2 for driving this roller 22.

Under the control of the controller 7, at the moving exposure unit 6, the motor M2 and the moving exposure unit 6 effect exposure of one-line amount of image information after another on to the print paper 3 with switching over the exposing colors. With completion of the exposures with all the exposing colors, by the drive of the motor M2, the roller 22 repeats transport of the print paper 3 by a distance corresponding to the one-line amount, with shifting the image information by one-line amount, so as to expose the print paper 3 with one-frame amount of image information.

The developing unit D, though not shown, includes a plurality of tanks filled with processing liquids for developing the exposed print paper 3. Thus, the print paper 3 is developed with its successive passage through these tanks.

Figure 2:
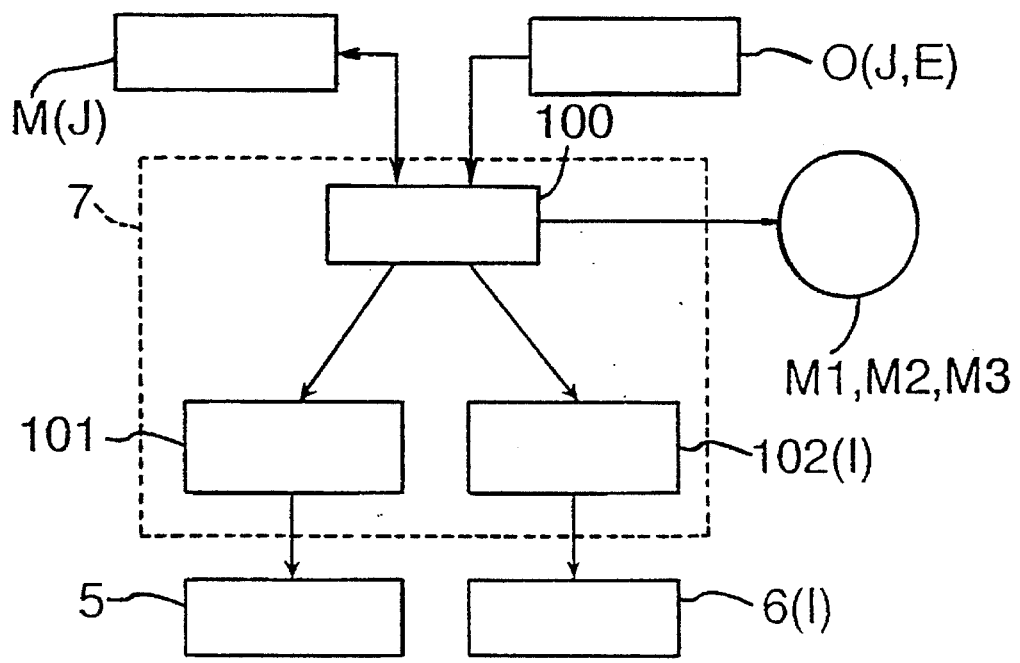
FIG. 2 is a diagram showing a control construction by a controller of respective components.

The controller 7, as shown in FIG. 2, includes a projection exposure calculating unit 101 for executing calculation of image information relating to the projection exposure unit 5, a moving exposure calculating unit 102 for executing calculation of image information relating to the moving exposure unit 6, and a control unit 100 for executing total control of the operations of these calculating units 101, 102 and the operations of the projection exposure unit 5 and the moving exposure unit 6. In addition, the controller 7 further executes control of the operations of the respective motors M1, M2 and M3. These functions are stored as one integral program at a memory 40 incorporated within the controller 7. The memory 40 further stores other information such as the image information read by the image sensor 15.

Figure 3:
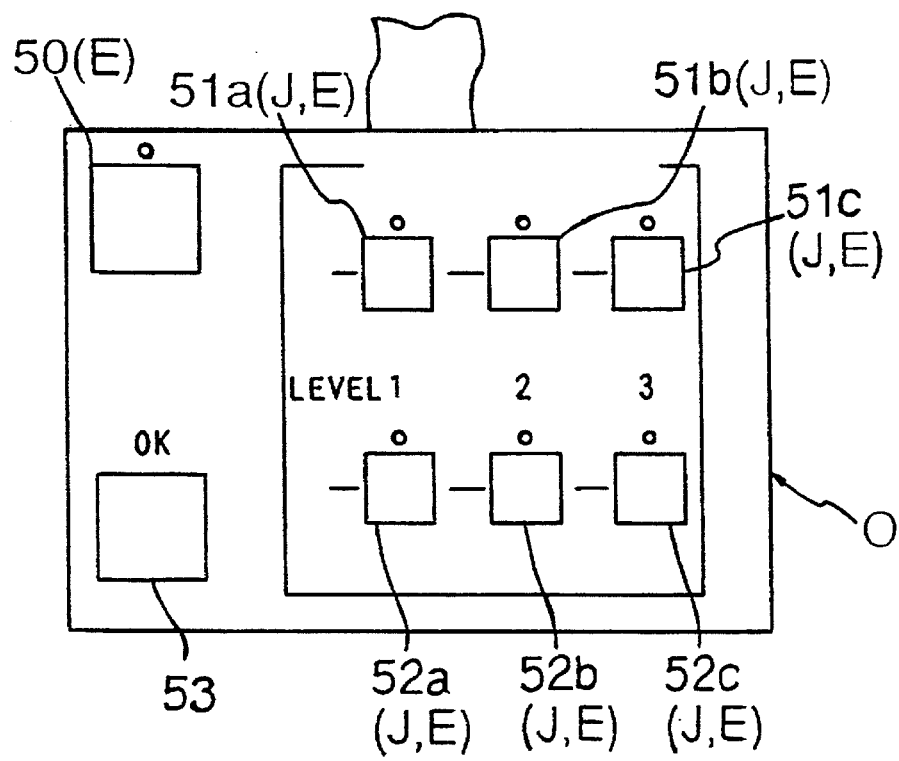
FIG. 3 shows an outer appearance of a control panel.

The control panel O connected to the controller 7, as shown in FIG. 3, includes a projection exposure key 50 for projecting/exposing the image of the film 2 at the projection exposure unit, contrast correction keys 51a, 51b, 51c for adjusting a correction amount of the contrast in the increasing direction in three steps of levels 1 through 3, and further contrast correction keys 52a, 52b, 52c for adjusting a correction amount of the contrast in the decreasing direction in three steps of levels 1 through 3. In either case, the level 1 is for the smallest amount of correction.

The control unit 100 of the controller 7 judges that the projection exposure mode has been instructed if the projection exposure key 50 of the above-described keys is depressed. On the other hand, the unit judges that the double exposure mode has been instructed if any one of the contrast correction keys 51a, 51b, 51c, 52a, 52b, 52 is depressed.

On a display screen of the monitor device M connected to the controller 7, though not shown, there is provided a touch-operated panel for effecting an area designation relating to correction of the image information.

Figure 4:
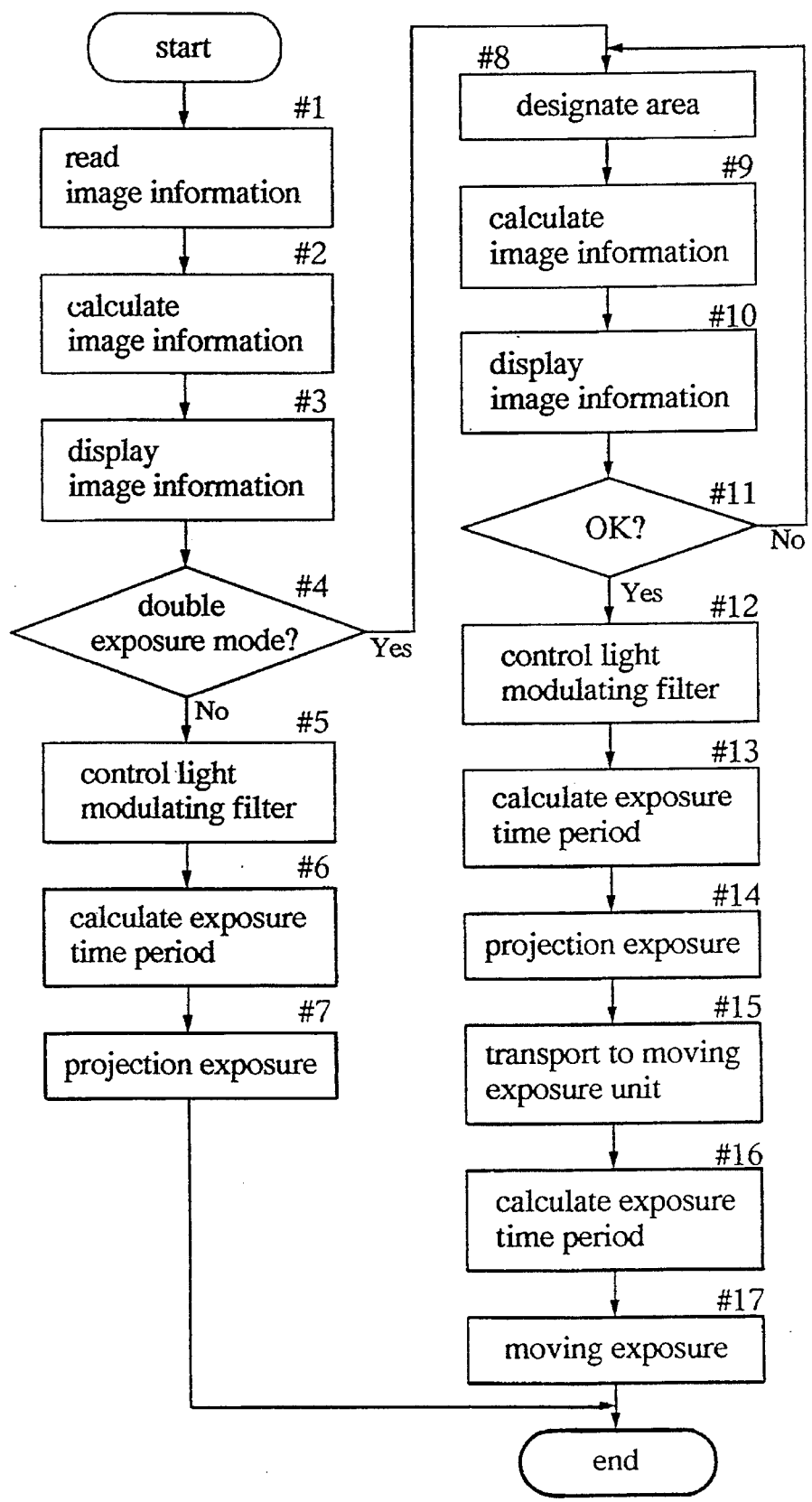
FIG. 4 is a flow chart illustrating control of operations of respective components effected by the controller.

Next, the control schemes executed by the controller 7 for controlling the operations of the respective components will be described with reference to a flow chart of FIG. 4.

First, the image information of the film 2 fed to the projection exposure unit 5 by feeding operations using the roller 16 and the motor M3 is read by the image sensor 15 as information of densities of the red, green, blue, three primary color components (step #1). Then, this read image information is calculated to be converted into data to be displayed on the monitor device M (step #2). In the course of this, if the film 2 comprises a negative film, it is necessary to convert the information of densities of the three primary color components into density information of the respective complementary color components.

With completion of the above-described calculation, based on the calculation result, the image information is displayed on the monitor device M (step #3). By viewing this display on the monitor device M, the operator may judge whether the image of the film 2 needs contrast correction or not and then effects an instruction input from the control panel 0

Next, it is judged whether the operation mode of the image printer 1 is presently set to the double exposure mode or to the projection exposure mode (step #4). If it is judged that the mode is set to the projection exposure mode with depression of the projection exposure key 50; then, by using the calculation result obtained at step #2, the light modulating filter 11 is controlled to an optimal color balance (step #5).

Thereafter, by using the calculation result obtained at step #2, an exposure time period is calculated (step #6). Then, based on the calculation result of this exposure time period, the shutter 14 is operated to expose the print paper 3 (step #7).

On the other hand, if it is judged at step #4 that the mode is presently set to the double exposure mode with depression of any one of the contrast correction keys 51a, 51b, 51c, 52a, 52b, 52c, the process reads an area designation inputted from the touch-operated panel of the monitor device M displaying the image information of the film 2 read by the image sensor 15 (step #8).

With the designation of the area by the touch-operated panel, if one of the contrast correction keys 51a, 51b, 51c for increasing the density has been depressed, this designated area is considered as a correction-target portion. Whereas, if one of the further contrast correction keys 52a, 52b, 52c for decreasing the density has been depressed, all the other area excluding the designated area is considered as a correction-target portion.

Next, the image information of the correction-target portion is singled out from the image information ready by the image sensor 15; then, on this singled-out image information, a correction calculation is effected in accordance with the degree of correction designated by the one of the contrast correction keys 51a, 51b, 51c, 52a, 52b, 52c, thereby to generate exposure image information (step #9).

In the above-described correction calculation, in either case where one of the contrast correction keys 51a, 51b, 51c for increasing the density has been depressed or where one of the further contrast correction keys 52a, 52b, 52c for decreasing the density has been depressed, the exposure image information is produced so that the exposure-target portion when exposed onto the print paper 3 has the higher density with the greater the degree of correction.

With the production of the exposure image information, this exposure image information together with the image information of the film 2 read by the image sensor 15 is displayed on the monitor device M (step #10).

If the correction result displayed on the monitor device M is not good and the operator again depresses one of the contrast correction keys 51a, 51b, 51c, 52a, 52b, 52c; then, the process returns to step #8 to repeat the above-described operations until a satisfactory result is obtained. If the correction result is satisfactory and the operator depresses an OK key 53 of the control panel O; then, the process goes on to the next step (step #11).

With the key operation at step #11 indicating the good correction result, by using the result of the calculation at step #2, the light modulating filter 11 of the projection exposure unit 5 is controlled to obtain the optimum color balance (step #12). Then, an exposure time period at the projection exposure unit 5 is calculated (step #13).

In this calculation of the exposure time period, if one of the contrast correction keys 52a, 52b, 52c for decreasing the density has been depressed, the exposure time period is corrected so that with the greater the degree of correction the lower the density of the image exposed onto the print paper 3.

With the determination of the exposure time period, with this determined exposure time period, the image of the film 2 is projected and exposed onto the print paper 3 (step #14).

Next, the print paper 3 is transported until the projected-exposed portion reaches the position of the moving exposure unit 6 (step #15). Then, an exposure time period is calculated for each of the three primary color components with respect to each of the divided areas (step #16). Based on the result of the calculation, the print paper 3 is exposed at the moving exposure unit 6 in the above-described manner (step #17).

Figure 5:
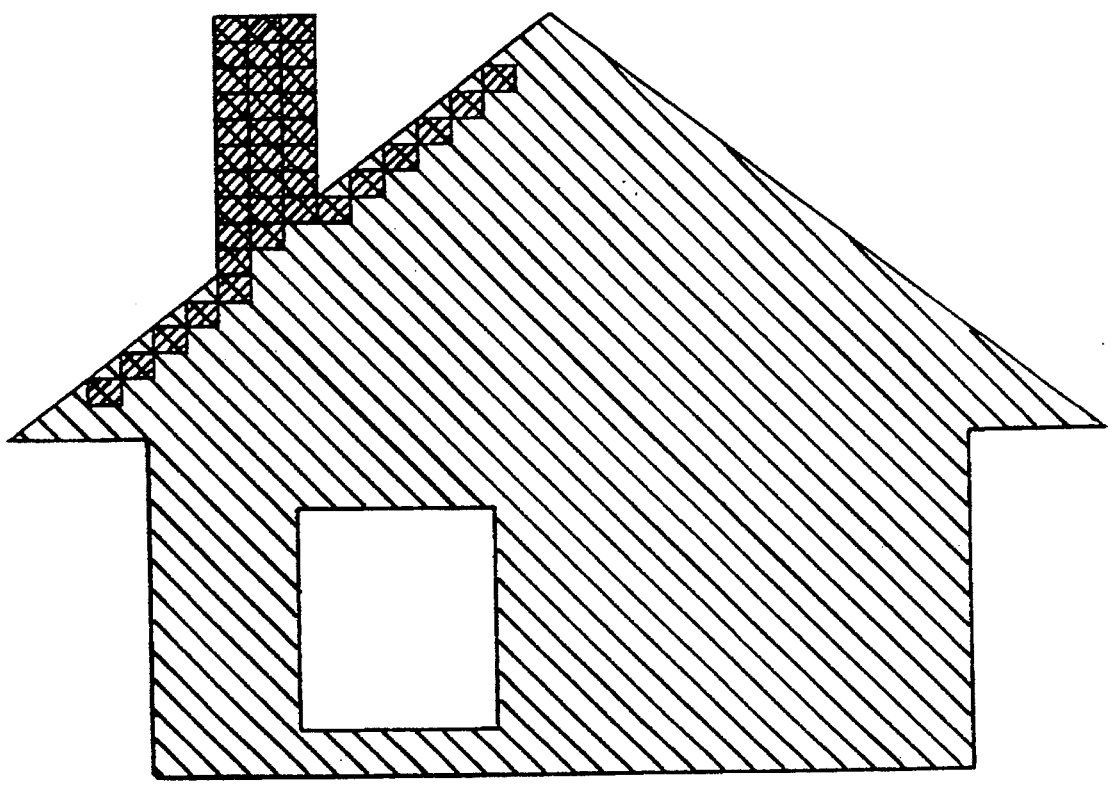
FIG. 5 shows an example of image information correction.
Figure 5:
Figure 5:

When the exposure at the projection exposure unit 5 and the further exposure at the moving exposure unit 6 are effected in the overlapping manner, as shown in FIG. 5 which shows the contrast-corrected portion of the image exposed onto the print paper 3 in an enlarged scale, the portion exposed by the moving exposure unit 6, by itself, shows a zigzag contour in a micro view in correspondence with the configuration of the rectangular areas constituting the number of areas. However, since this image portion is overlapped with the further image exposed at the projection exposure unit 5, the zigzag contour appears less conspicuously.

Accordingly, the moving exposure unit 6 and the controller 7 together function as an image exposure unit I for exposing the print paper 3 based on the exposure image information.

The rollers 20, 22 and the motors M1, M2 together function as transport means T for transporting the print paper 3 through the projection exposure unit and the moving exposure unit 6. The contrast correction keys 51a, 51b, 51c, 52a, 52b, 52c of the control panel O and the monitor device M together Function as correction information inputting means J.

The controller 7 functions as the control unit 100 for controlling the projection exposure unit 5, the image exposure unit I and the transport means T. The roller 16 and the motor M3 together function as film feeder means S for feeding the film 2 to the projection exposure unit 5. The image sensor 15 functions as reader means for reading the image information of the film 2.

The projection exposure key 50 and the contrast correction keys 51a, 51b, 51c, 52a, 52b, 52c of the control panel O together function as exposure mode instructing means E for instructing a switch over between the projection exposure mode and the double exposure mode to the control unit 100.

Next, other embodiments will be specifically described.

(1) In the foregoing embodiment, the area designation based on which the correction-target portion is to be recognized is carried out from the touch-operated panel provided to the monitor device M. Instead of this, this area designation may be effected through a cursor displayed on the monitor device M, with the cursor being movable by e.g. a mouse.

(2) In the foregoing embodiment, the correction of the image information read by the image sensor 15 comprises correction of contrast. Instead, any other correction, e.g. correction of color tone may be effected.

(3) In the foregoing embodiment, the moving exposure unit 6 employs the light shutter using PLZT. Instead, a light shutter using liquid crystal elements may be used as the print head.

(4) In the foregoing embodiment, at the moving exposure unit 6, the irradiation light from the exposure light source 30 is guided to the PLZT print head 36 by means of the optical fiber bundle 35. Alternately, the irradiation light from the exposure light source 30 may be converged on to the PLZT print head 36 by means of a lens, for example.

(5) In the foregoing embodiment, in exposing the print paper 3 at the moving exposure unit 6, the one-line amount of exposure operation and the transporting operation of the print paper 3 for one-line amount are repeated in the alternating manner to effect exposure of each line of the image information. Instead of this, the exposure of each line of the image information may be effected one after another while the print paper 3 is being transported in a continuous manner at a fixed speed.

(6) In the foregoing embodiment, in the input operation of correction content from the control panel O, the degree of correction on only one designated area is effected by operating one of the contrast correction keys 51a, 51b, 51c, 52a, 52b, 52c. Instead, it is also conceivable to adapt the system to allow designation of a plurality of areas from the monitor device M and to allow degree of correction of each of these designated areas.

(7) In the foregoing embodiment, the exposure at the projection exposure unit 5 precedes the exposure at the image exposure unit I. Instead, the order of these exposures may be reversed.

(8) In the foregoing embodiment, the print paper 3 is employed as a photosensitive material. Instead, a photosensitive drum as used in a copier may be employed.

(9) In the foregoing embodiment, the CCD line sensor is employed as the image sensor 15 for reading image information of the film 2. Instead, for reading the image information of the film 2, a CCD image sensor or an image pick-up tube may be employed.

(10) In the foregoing embodiment, for correction of contrast, one of the three steps of degrees may be designated in the density increasing direction and in the density decreasing direction, respectively. Alternatively, it is also conceivable to adapt the system to allow the correction in more than four degrees or less than two degrees or further to adapt the system to allow the correction in a stepless continuous manner.

The invention may be embodied in other specific forms without departing from the sprit or essential characteristics hereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An image printer comprising:

a projection exposure unit for projecting and exposing an image of a film onto a photosensitive material;

an image exposure unit for exposing the photosensitive material based on exposure image information with setting an exposure amount for each of a number of areas of the photosensitive material;

transport means for transporting the photosensitive material through the projection exposure unit and the image exposure unit;

reader means for reading the image information of the film with dividing the image information into a number of areas;

correction information inputting means for inputting a correction-target portion of the image information read by the reader means and a correction content for the correction-target portion;

wherein, based on the image information read by the reader means and on correction information instructed by said correction information inputting means, said image exposure unit generates, as said exposure image information, image information concerning only said correction-target portion corrrected in accordance with said correction content; and said transport means being adapted to transport said photosensitive material in such a manner that the projection exposure by said projection exposure unit are and the exposure by said image exposure unit are effected in an overlapping manner onto the photosensitive material.

2. An image printer as defined in claim 1, further comprising:

a controller for controlling the operations of the projection exposure unit, the image exposure unit and of the transport means;

exposure-mode instructing means for instructing said controlling to be switched over between a double exposure mode and a projection exposure mode;

with an instruction of the double exposure mode, said controller executing a control scheme for effecting the exposure at the projection exposure unit and the further exposure at the image exposure unit in an overlapping manner onto the photosensitive material; whereas, with an instruction of the projection exposure mode, said controller executing a further control scheme for effecting the exposure at the projection exposure unit onto the photosensitive material.

3. An image printer as defined in claim 1, wherein said reader means is disposed so as to read image information of a film charged to film feeder means for feeding the film to said projection exposure unit.

4. An image printer as defined in claim 1, further comprising a monitor device for displaying the image information read by said reader means.

5. An image printer as defined in claim 4, wherein said correction information inputting means designates the correction-target portion with respect to the image information displayed on the monitor device.

6. An image printer as defined in claim 5, further comprising:

a controller for controlling the operations of the projecting exposure unit, the image exposure unit and of the transport means;

exposure-mode instructing means for instructing said controller to be switched over between a double exposure mode and a projection exposure mode;

with an instruction of the double exposure mode, said controller executing a control scheme for effecting the exposure at the projection exposure unit and the further exposure at the image exposure unit in an overlapping manner onto the photosensitive material; whereas, with an instruction of the projection exposure mode, said controller executing a further control scheme for effecting the exposure at the projection exposure unit onto the photosensitive material.

7. An image printer as defined in claim 6, wherein, when the double exposure mode is instructed, said controller corrects an exposure amount at the projection exposure unit in accordance with a degree of correction of the correction content inputted through said correction information inputting means.

8. An image printer as defined in claim 6, wherein said reader means is disposed so as to read image information of a film charged to film feeder means for feeding the film to said projection exposure unit.

9. An image printer as defined in claim 8, wherein, when the double exposure mode is instructed, said controller corrects an exposure amount at the projection exposure unit in accordance with a degree of correction of the correction content inputted through said correction information inputting means.

10. An image printer as defined in claim 9, wherein said correction information inputting means includes a plurality of contrast correction keys of said controller and said monitor device.

* * * * *